(12) United States Patent
Bennett et al.

(10) Patent No.: US 8,351,363 B2
(45) Date of Patent: Jan. 8, 2013

(54) METHOD AND APPARATUS FOR ENHANCED FILE DISTRIBUTION IN MULTICAST OR BROADCAST

(75) Inventors: Chris Bennett, San Diego, CA (US); Charles Lo, San Diego, CA (US); Kirti Gupta, San Diego, CA (US); Ranjith Jayaram, San Diego, CA (US); Thadi Nagaraj, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 973 days.

(21) Appl. No.: 11/400,619

(22) Filed: Apr. 6, 2006

(65) Prior Publication Data

US 2006/0248090 A1    Nov. 2, 2006

Related U.S. Application Data

(60) Provisional application No. 60/669,505, filed on Apr. 8, 2005.

(51) Int. Cl.
*H04H 20/71* (2008.01)
(52) U.S. Cl. .................... 370/312; 370/432; 709/227
(58) Field of Classification Search .......... 709/227–230; 370/252–253, 312, 349–350, 390–427, 431–546
See application file for complete search history.

(56) References Cited

U.S. PATENT DOCUMENTS 6,219,669 B1 *   4/2001   Haff et al. .................. 707/10
2003/0118323 A1 * 6/2003   Ismail et al. ................ 386/83
2004/0207723 A1 * 10/2004  Davis et al. ............. 348/14.04
2006/0015568 A1 * 1/2006   Walsh et al. ................ 709/217
2006/0193337 A1 * 8/2006   Paila et al. ................. 370/432
2007/0248029 A1 * 10/2007  Merkey et al. .............. 370/255
2008/0137688 A1 * 6/2008   Walsh ........................ 370/498

FOREIGN PATENT DOCUMENTS

| CN | 1221286 A | 6/1999 |
|---|---|---|
| CN | 1505398 A | 6/2004 |
| CN | 1516466 A | 7/2004 |
| FI | XP002365309 | * 11/2003 |
| JP | 8181966 A | 7/1996 |
| JP | 2001103020 A | 4/2001 |
| JP | 2003304511 A | 10/2003 |
| JP | 200586453 | 3/2005 |
| WO | 0036804 A | 6/2000 |

(Continued)

OTHER PUBLICATIONS

Nokia "FLUTE for MBMS downloading", 3GPP TSG, SA4#29 Meeting, s4-30772, Nov. 8, 2003. pp. 1-10, XP 00230309.

(Continued)

*Primary Examiner* — Ricky Ngo
*Assistant Examiner* — Iqbal Zaidi
(74) *Attorney, Agent, or Firm* — Kam T. Tam; John J. Ketchum

(57) ABSTRACT

In a communication system providing broadcast services in which files for broadcast are accessible by the users. Contents of the broadcast files and the file attributes required to process the broadcast files are separately sent. As arranged, receiving the file attributes ahead of the content files allow more efficient download and processing of the broadcast files.

41 Claims, 9 Drawing Sheets

FOREIGN PATENT DOCUMENTS

WO 2004075548 A1 9/2004

OTHER PUBLICATIONS

International Search Report—PCT/US06/013276—International Search Authority, European Patent Office—Aug. 4, 2006.

Taiwanese Search Report—TW095112587—Search Authority—TIPO—Aug. 29, 2009.
Written Opinion—PCT/US06/013276—International Search Authority, European Patent Office—Aug. 4, 2006.

* cited by examiner

METHOD AND APPARATUS FOR ENHANCED FILE DISTRIBUTION IN MULTICAST OR BROADCAST

CLAIM OF PRIORITY UNDER 35 U.S.C §119

The present application for patent claims priority to U.S. Provisional Application No. 60/669,505, entitled "Method and Apparatus to Enhance File Distribution for Mobile Broadcast Applications," filed on Apr. 8, 2005, and assigned to the assignee hereof and expressly incorporated by reference herein.

BACKGROUND

I. Field

The present invention generally relates to data communications, and more particularly, to enhanced file distribution in data communication systems in multicast or multicast environments.

II. Background

Interconnecting of networks globally allows information to be swiftly accessed irrespective of geographical distances. FIG. 1 shows a simplified schematic drawing of the global connection of networks, commonly referred to as the Internet signified by the reference numeral 20. The Internet 20 is in essence many networks with different levels of hierarchy linked together. The Internet 20 is operated under the Internet Protocol (IP) promulgated by the Internet Engineering Task Force (IETF). Details of the IP can be found in Request for Comments (RFC) 791 published by the IETF.

Connected to the Internet 20 are various individual networks, sometimes called local area networks (LANs) or wide area networks (WANs) depending on the network sizes. Shown in FIG. 1 are some of such networks 22, 24, and 26.

Within each of the networks 22, 24 and 26, there can be various pieces of equipment connected to and in communication with each other. Examples are computers, printers, and servers, to name just a few, which are commonly called nodes. When a node communicates beyond its own network via the Internet 20, the node needs to send data packets in compliance with the IP to the corresponding node in the other network. Likewise, data packets sent out by the corresponding node in the other network to the initiating node have also to conform with the IP.

Different types of applications necessitate different levels of protocols operating in conjunction with the IP. Take a few examples for illustration. Suppose the node 28 in the network 22 tries to download a file from another node 30 in the network 26. For file transfer, very often, a higher order protocol called the File Transfer Protocol (FTP) is used. The FTP can be found in RFC 959 published by the IETF. As such, data packets sent by the node 30 to the node 28 have to conform with, among other things, the FTP and the IP.

As another example, suppose the node 28 in the network 22 browses through the Internet 20 a website posed by yet another node 32 in the network 24. This time, the nodes 28 and 32 possibly use another higher order protocol, called the Hyper Text Transfer Protocol (HTTP). The HTTP can be found in RFC 2616 published by the IETF. Again, the exchanged data packets have to conform with, among other things, the HTTP and the IP.

The exemplary protocols FTP and HTTP are carried through still another intermediate level protocol, called the Transport Control Protocol (TCP). The TCP can be found in RFC 793. Under the TCP, the objective is to transmit data accurately. As such, erroneous data are always retransmitted. The TCP and the protocols that ride on the TCP, such as the FTP and HTTP, are commonly employed for one-to-one applications.

Advances in technologies make data intensive data transfers possible. For instance, networks capable of handling high bandwidths allow exchanges of multi-media files, such as audio and video files which normally hold massive data. When a large number of nodes receive such multimedia files, file delivery via conventional unicast methods may be inefficient. Among other things, the files need first to be replicated and thereafter delivered individually to each node. Consequently, there is a need to develop other types of protocols to address the increasing demand for one-to-many applications, suitable to be used for broadcast or multicast services.

To meet the demand, the File Delivery over Unidirectional Transport (FLUTE) protocol, specifically suitable for multicast file distribution applications, has been devised. The FLUTE protocol can be found in RFC 3926, published by the IETF, entitled "FLUTE—File Delivery over Unidirectional Transport," Nov. 14, 2003. In a multicast session, traffic flow is more or less unidirectional. That is, reverse data traffic is limited, if at all existent. Such unidirectional usage is common in broadcast or multicast applications in which there is one communication source sending data to many receivers.

Data transmitted under the FLUTE protocol are carried on the top of the User Datagram Protocol (UDP), instead over the TCP as in the HTTP and FTP protocols. Under the UDP, erroneously data are not normally resent. For accurate data transmission, the FLUTE protocol normally transmits data in redundancy and uses error correcting schemes.

Using the FLUTE protocol, one or more files are transported during a file delivery session. The files are carried in data packets in the form of asynchronous layered coding (ALC), called the ALC packets. Depending on its length, each file may be transmitted in one or more ALC packets. The files are called objects. The objects are identifiable by file attributes contained in a file delivery table (FDT). At the receiver's end, the file attributes are relied on to reconstruct the original file from the ALC packets. The received file objects cannot be processed until the corresponding file attributes are correctly received. For higher reliability of FDT reception, duplicate FDT instances are typically interposed with the payload data in the ALC packets sent to the receivers. Heretofore, the FDTs and the content files are more or less transmitted concurrently. As such, even if the content files are correctly received, which is not always the case, a receiver needs to correctly receive the FDTs, extract the file attributes from the FDTs and thereafter processing the received content files. That is, a successful decoding and the subsequent presentation of a received file depend on a successful download of the file attributes needed for processing the ALC packet, more or less at the same time. Such dependence unavoidably introduces delays and often negatively impacts the quality of the content presentation. Furthermore, users without the correct file attributes very often make multiple attempts to acquire the needed file attributes, thereby typing communication channels. As a result, it may not be the most efficient use of available communication resources.

Accordingly, there is a need to provide more efficient schemes for better quality of broadcasts and in addition more economical utilization of communication resources.

SUMMARY

In a communication system providing broadcast services in which files for broadcast are accessible by the users. Contents of the broadcast files are sent in a one communication session. The file attributes required to process the broadcast files are separately sent in another communication session. As arranged, receiving the file attributes ahead of the content files allow more efficient download and processing of the broadcast files.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Figure 1:
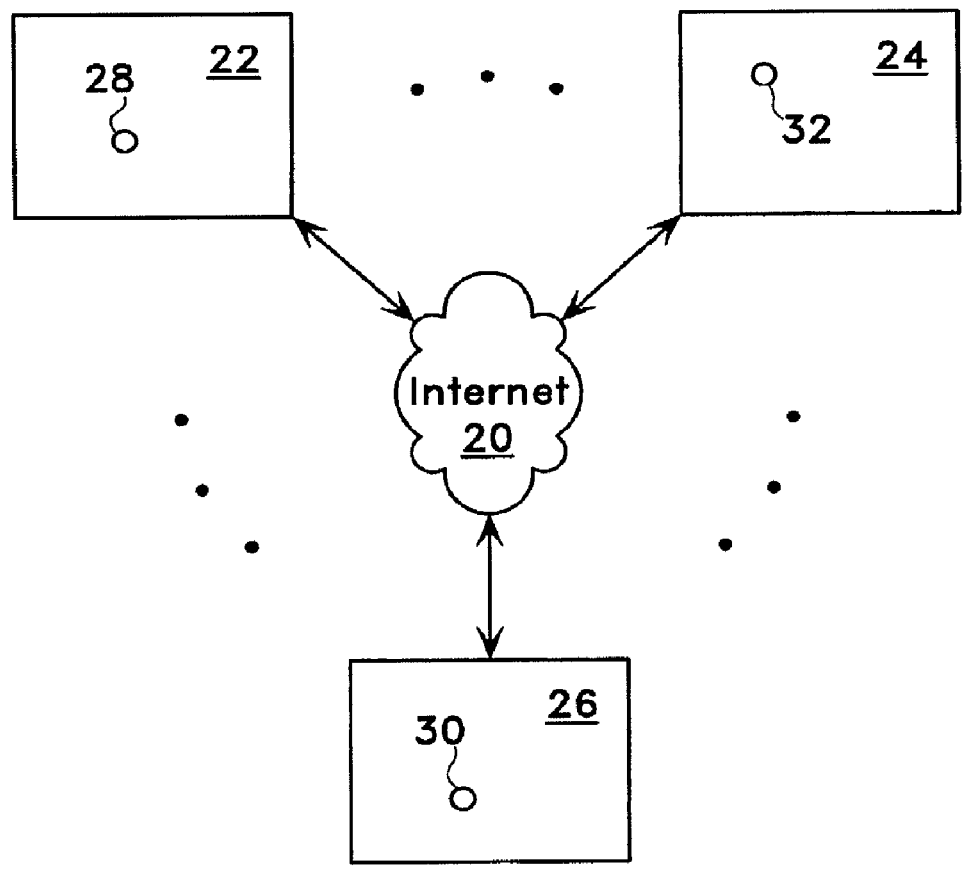
FIG. 1 is a schematic drawing of the global connection of networks.
Figure 2:
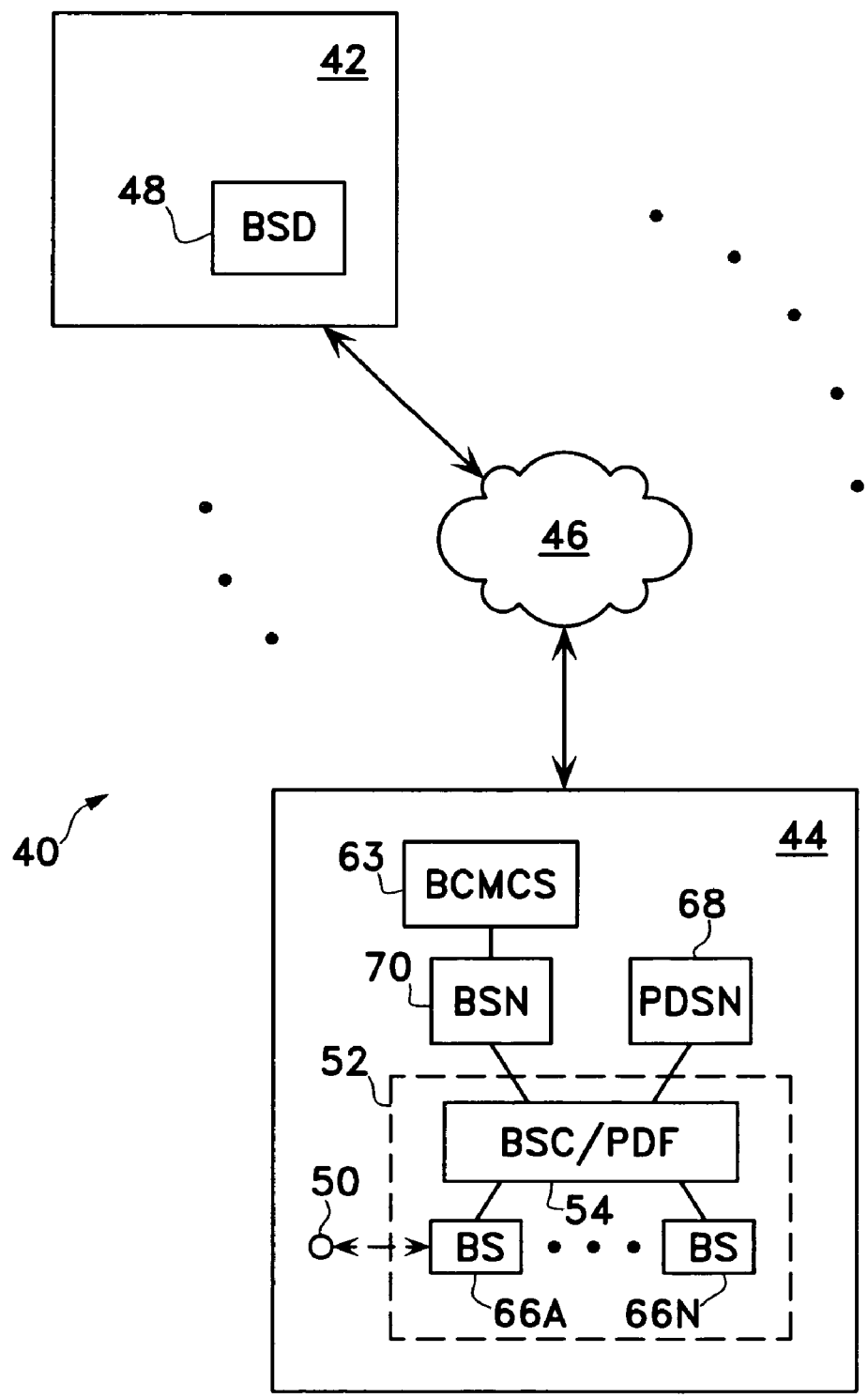
FIG. 2 is a schematic drawing of the nodes and networks involved in an exemplary embodiment of the invention.

FIG. 2 shows a simplified schematic drawing of an exemplary embodiment of the invention. The overall system is generally signified by the reference numeral 40. In the communication system 40, only two networks 42 and 44 are shown for reasons of simplicity and clarity in explanation. The networks 42 and 44 are linked by a backbone network 46, such as an intranet or the Internet.

Suppose in this embodiment, the network 42 is operated by a service provider. The service provider installs a node 48 in the network 42. In this example, the node 48 is called a broadcast service distributor (BSD). The content server 48 can be designed to hold broadcast contents and also associated information of the broadcast provided by the service provider.

In the network 44, there is a subscriber node 50 capable of receiving services, including services provided by the server node 48 via the backbone network 46. In this embodiment, the node 50 is depicted as a wireless device, such as a personal digital assistant (PDA), a mobile computer, or a cellular telephone, to name just a few. The network 44 supports wireless technologies such as the cdma2000 standards as set forth by the 3GPP2 (Third Generation Partnership Project 2), which is a consortium of several international standards bodies, including the TIA/EIA (Telecommunications Industry Associations/Electronic Industries Associations) of the United States. It should be noted that the network 40 can also support other standards, such as the WCDMA (Wideband Code Division Multiple Access) standards promulgated by the 3GPP (Third Generation Partnership Project), coordinated and supported by various European standards entities. Another example is the standards developed by the Forward Link Only (FLO) Forum, which is an association of various entities in the wireless industry promoting standardization for use in the FLO networks.

The subscriber unit 50 communicates with the network 44 via a radio access network (RAN) 52. The RAN 52 includes a base station controller/packet data control function (BSC/PDF) 54 connected to a plurality of base stations (BSs) 66A-66N. In the networks 44, there is implemented a packet data serving node (PDSN) 68 and a broadcast serving node (BSN) 70. Both the PDSN 68 and the BSN 70 serve the function of interfacing between the backbone network 46 and the RAN 52 in the network 44. The BSN 70 is installed more toward multicast or broadcast usage while the PDSN 68 mostly deals with unicast applications. In this specification, the terms multicast and broadcast are used interchangeably.

In the network 44, there is another server, called the broadcast multicast service (BCMCS) content server 63 connected to the BSN 70. In general, the BCMCS content server 63 pre-stores broadcast contents and associated data of the broadcast contents, including that provided by the content server 48, transferred via the backbone network 46.

In the exemplary embodiment, communications among some of the nodes are depicted as carried out wirelessly. However, it should be appreciated that it need not always be the case. Non-wireless communications via various other means among those nodes are also applicable. For example, instead of a wireless device, the node 50 can be a stationary computer or another server communicating with the network 44 via optical links or conventional conductive cables.

Suppose in this embodiment, the backbone network 46 supports the Internet Protocol (IP). Prior to describing the operational details, it helps first to explain generally the processing of a data packet during packet data communications via the various levels of protocols of different hierarchies and their mutual relationships operating under the IP.

In the art of network communications, protocols are hierarchized in accordance with the Open System Interconnection (OSI) model, as set forth by the International Organization for Standardization (ISO) and the International Telecommunication Union-Telecommunications Standards Sector (ITU-T). The purpose is to facilitate multi-vendor equipment interoperability. That is, each level of protocol hierarchy has its own specifications. As such, as long as the specifications of a particular hierarchy level are met, developments of products in that level are assured to be compatible with other products in other levels.

Figure 3:
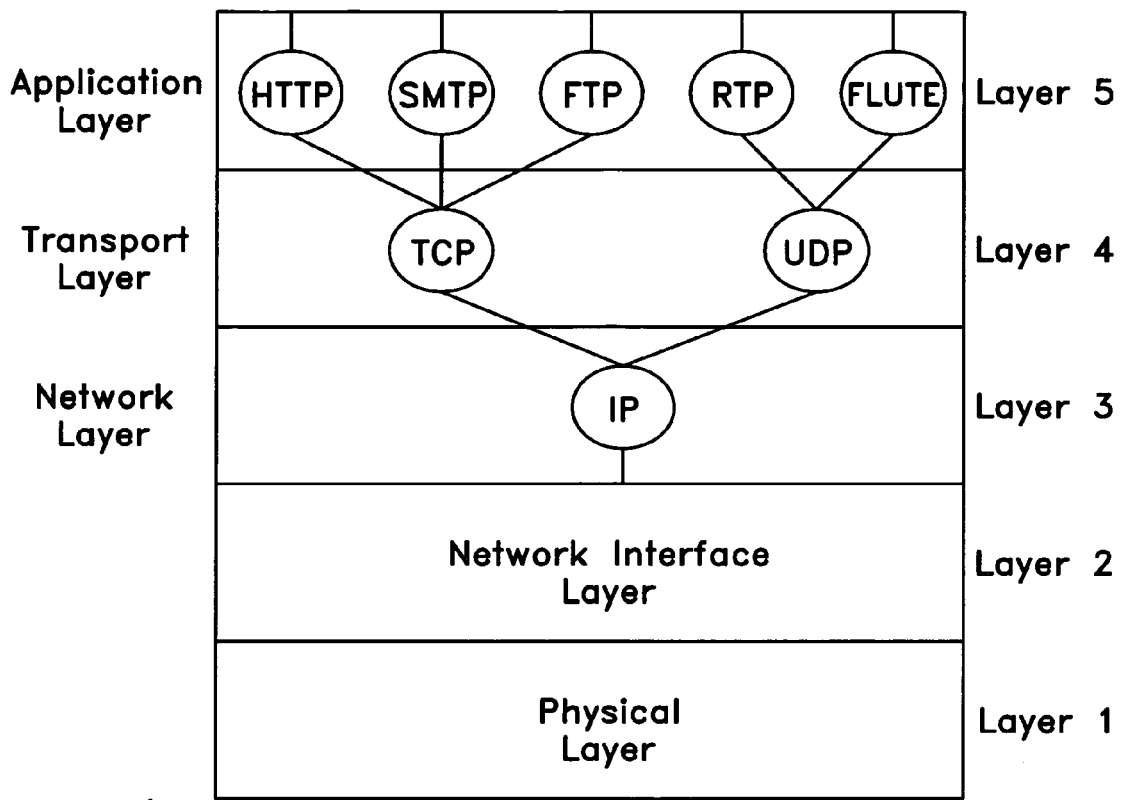
FIG. 3 is a schematic drawing showing a stack of protocols in hierarchical order.

FIG. 3 schematically shows a stack of protocols in hierarchical order, commonly referred to as the "protocol stack," and is generally signified by the reference numeral 72. The IP protocol stack 72 is structured in conformance with the Internet Engineering Task Force (IETF) model which is similar to but not exactly the same as the OSI model. In accordance with the IETF model, the IP protocol stack 72 has five layers, starting from Layer 1 to Layer 5. Thus, a data packet sent out by a node, such as the node 48 or 50 as shown in FIG. 2, has to be processed through the protocol stack 72. The stack of protocols 72 is built in the node in the form of software or hardware, or a combination thereof. Likewise, a data packet received by the same node has to be processed through the same protocol stack 72 but in the reverse order.

Take an example for illustration. Suppose a data packet is processed to be sent out from a node, for instance the node 48 (FIG. 2), the data packet is first created in accordance with one of the protocols in the application layer, i.e., Layer 5. Layer 5 includes the Hyper Text Transfer Protocol (HTTP), Service Mail Transfer Protocol (SMTP), File Transfer Protocol (FTP), Real Time Transfer Protocol (RTP), and the File Delivery Over Unidirectional Transport/Asynchronous Layered Coding (FLUTE/ALC) protocol. Further suppose the data packet is a product of a VoIP (Voice over Internet Protocol) session. The data packet thus has to be formatted in accordance with the RTP in Layer 5.

Time sensitive data packets, such as the data packet resulted from the RTP in Layer 5, need to be processed in real time. Specifically, defective packets are not normally resent but instead simply dropped so as not to obstruct transmissions of other oncoming data packets. RTP data packets are therefore normally carried via the User Data packet Protocol (UDP) in Layer 4, the transport layer. Accordingly, the data packet from the RTP in Layer 5 has further to be formulated in accordance with the UDP in Layer 4.

On the other hand, if the data packet originates from other protocols in the Layer 5, such as the FTP, the data packet is normally sent via the Transport Control Protocol (TCP) in Layer 4. Under the TCP, accurate delivery of the data packet is of prime importance. As such, defective packets are always resent, albeit possibly slowing down the overall data transmission process.

Data packets after passing through this transport layer, Layer 4, are added with information such as the source and destination port numbers.

The data packet after going through the transport layer, Layer 4, is then sent to the network layer, Layer 3, for processing. In this particular case, the resultant data packet from Layer 4 has to be formatted again in accordance with the IP, for instance, with the source and destination addresses of the data packet added.

Thereafter, the data packet has to be framed to fit into whatever protocol is applicable in the link layer, Layer 2. For example, if the server node 48 is connected to the network via the Ethernet, then Layer 2 would be in the form of a Ethernet protocol, as set forth in the document no. IEEE 802.3, published by the Institute of Electrical and Electronics Engineers (IEEE).

Figure 5:
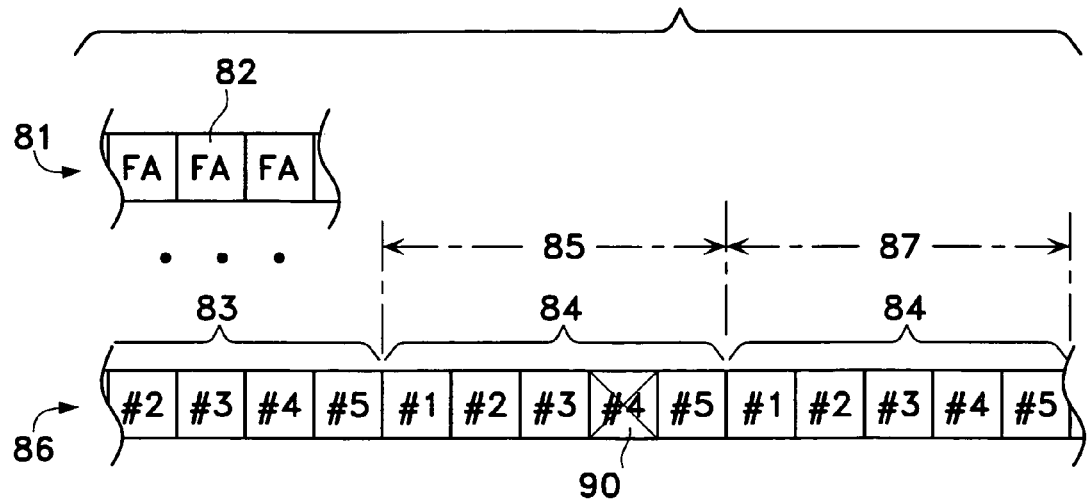
FIG. 5 is a schematic drawing which shows the CFD method operated in accordance with the exemplary embodiment of the invention.

The bottom-most layer of the protocol stack 72 in FIG. 5 is the physical layer, Layer 1, which deals with the physical implementation of the transmission for the data packet. For example, in FIG. 2, if the communication link between the node 48 and the network 42 is a conventional wire link, then the physical layer, Layer 1, concerns with hardware circuitry on both the nodes 48 and the interface circuitry of the network 42. As another example, in FIG. 2, if the communication link between the node 50 and the BS 66A is the air interface. In that case, the physical layer, Layer 1, relates to the air space and the hardware circuitry of the RAN 52 transceiving signals via the air space.

Reference is now returned to FIG. 3. As for a data packet received by the exemplary node 50 (FIG. 2), the data packet has to be processed through the same protocol stack 72 but in the reverse order, that is, from Layer 1 to Layer 5.

The operations of an exemplary broadcast process in the system 40 is herein described. In FIG. 2, as mentioned earlier, it is assumed that the node 48, i.e., the BSD, is installed in the network 42 by the service provider providing broadcast services to subscribers in which the node 50 is one of such subscribers. For example in this case, the node 50 may be roaming from another network to the network 44 and seeks access of a news clip, for instance, the 7:00 p.m. news available from the service provider operating the network 42.

If the network 44 supports broadcast services, oftentimes, the network 44 maintains a broadcast channel for the available services. The information for the available services can be organized in the form of a downloadable file. Alternatively, the same information can be presented in the form of a constant stream of real-time viewable data.

Suppose in this exemplary embodiment, the available services are grouped together as a downloadable file in a manner similar to the broadcast Service Guide (SG), as promulgated by the Open Mobile Alliance (OMA), a consortium of various entities in the wireless industry, including service providers, hardware and software vendors, and network operators, etc., for purpose of unifying the various standards in wireless communications. Details of the SG are set forth in a publication published by the OMA, OMA-TS-BCAST-Service-Guide-V1.

Heretofore, while in the network 44, the user of the node 50 needs to refer to the SG for the available services. For that purpose, the SG has to be downloaded from the network 44. The user of the node 50 then selects the sought service from the SG and thereafter tunes to the channel carrying the service, as provided in the SG.

For some services, such as downloading of music, the user of the node 50 can download the sought files first and enjoy the downloaded files later. For other services, such as a news broadcast session, contents of the sought files are downloaded and presented more or less simultaneously. That is, the sought service is presented in real time, so is the download of the files associated with the service. There are several drawbacks associated with such an approach. Among other things, since a successful presentation of the file content depends on the successful download not only of the content itself, but also the successful download of the file attributes needed to process the content files. Such dependence unavoidably introduces delays and often negatively affects the user's experience associated with the content presentation. In addition, to better assure reliable data packet reception, redundant data are normally sent. Consequently, it may not result in the most efficient use of available communication resources, as explained further below.

Figure 3A:
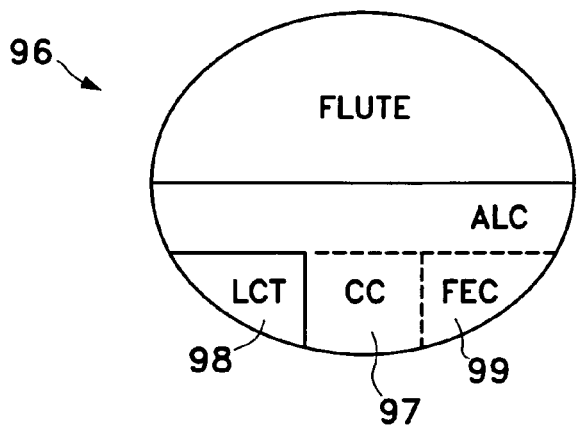
FIG. 3A is a more detailed schematic representation of the FLUTE protocol.
Figure 4:
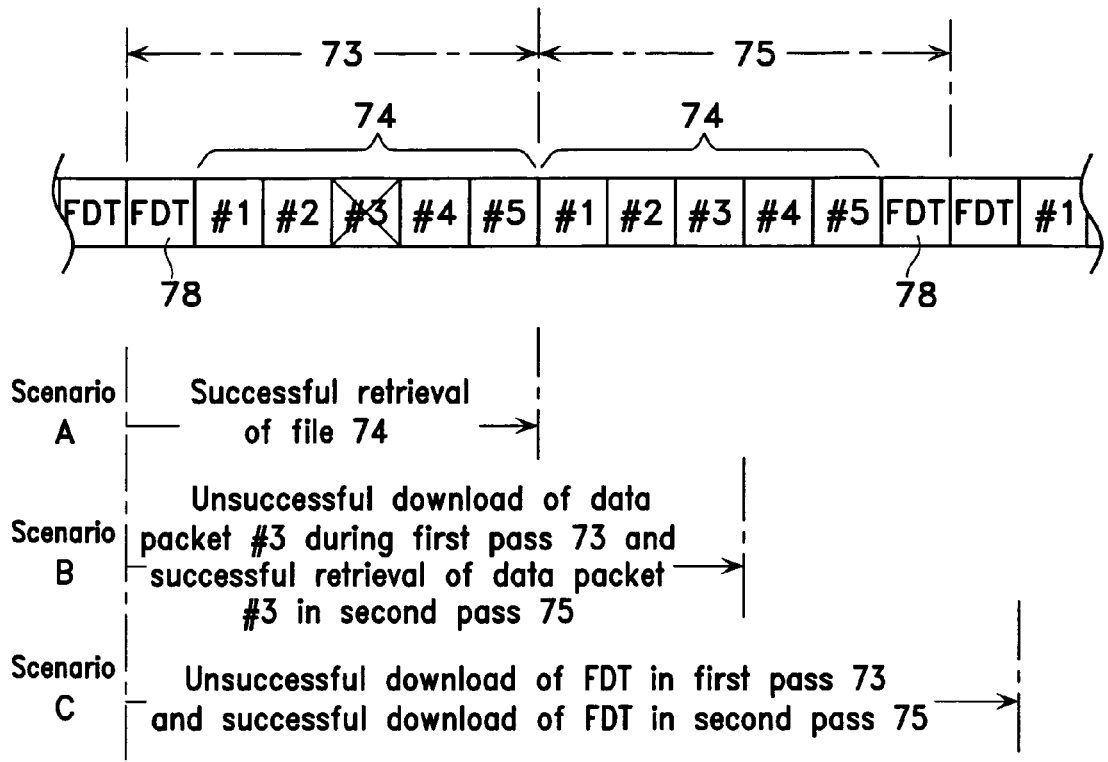
FIG. 4 is a schematic drawing which shows the methodology of the CFD method operating under the FLUTE protocol.

Suppose the content of the files of the sought services are transported via the FLUTE/ALC protocol. To ensure accurate data transport, conventionally, the Carousel File Distribution (CFD) method is used in conjunction with the FLUTE/ALC protocol. FIG. 3A shows a more detailed schematic representation of the FLUTE/ALC protocol and will be further discussed later. FIG. 4 shows the methodology of the CFD scheme operating under the FLUTE/ALC protocol.

In FIG. 4, a file is signified by the reference numeral 74. A piece of multimedia content, such as the news clip in this example, may comprise a multiple number of files. In the file 74, each ALC data packet is signified by one of the data packets #1-#5. Associated with the delivery of each file 74 is an ALC data packet containing a file delivery table (FDT) 78, which is also configured in the ALC protocol format.

In the FDT 78, various parameters or attributes needed to decode the data packets #1-#5 are included. Such parameters may comprise, but not limited to, the file name, the file identification (ID), source location of the file (i.e., the URI), the presentation time, the file size, the content type, the encoding scheme, the forward error correction (FEC) type and the FEC-related parameters, and security-related parameters, if applicable.

Under the CFD method, a file is transmitted multiple times. In this example, the file 74 which includes the content packets #1-#5 along with the associated FDT 78, are transmitted first time in the first pass 73, and then a second time in a second pass 75. In the first pass 73, the FDT 78 is transmitted ahead of the content packets #1-#5. In the second pass 75, the same FDT 78 is transmitted at the end of the content packets #1-#5.

One purpose of transmitting each file repeatedly is to eliminate the requirement that all receivers be properly time-aligned to receive the file. That is, there is no need to synchronize the receivers for purpose of receiving the file.

The other reason for transmitting each file repeatedly is to ensure accuracy during data transport, in the event that when there is no FEC scheme installed, or even if installed, the FEC mechanism fails to operate. To accomplish this end, the CFD method is designed to encompass three scenarios, as identified by Scenarios A, B and C shown in FIG. 4. Beyond the three Scenarios A, B and C, a failed file download can be declared.

In Scenario A, suppose the node 50 tries to download the file 74. During the first pass 73, the node 50 needs to successfully receive the FDT 78. Assume the download of the FDT 78 in the first pass 73 is successful without error. Then the node 50 receives the subsequent data packets #1-#5. Assume the download of all the data packets #1-#5 in the first pass 73 is also successful. Using the information in the downloaded FDT 78 from the first pass 73, the node 50 can decode the data in all the packets #1-#5 for the assembly of the entire file 74.

In Scenario B, during the download of the file 74 in the first pass 73, suppose retrieval of the FDT packet 78 is successful. Retrieval of all the content packets #1-#5 in the first pass is also successful except the data packet #3. Suppose the implemented FEC mechanism does not function. In that case, the node 50 has to wait until the second pass 75 to receive the identical data packet #3 during the second pass 75 to compensate for the corresponding defective packet #3 received in the first pass 73. Thereafter, using information from the FDT 78 obtained from the first pass, the node 50 can decode all the data packets for the reconstruction of the file 74.

In Scenario C, the node fails to correctly receive the FDT 78 in the first pass 73, even though all the data packets #1-#5 are correctly downloaded in the first pass 73. In that case, the node 50 has to wait until the second pass 75 to retrieve the corresponding FDT 78 to compensate for the erroneous FDT 78 from the first pass 73 for the correct decoding of all the data packets of the file 74.

Under unfavorable signal reception conditions, the extra steps implemented on the top of the FEC as described above in Scenarios A, B and C may not be able to correct any corrupt data. That is, as mentioned earlier, the download of the file 74 can be declared a failure. In Scenario B, the loss of the data packet #3 may only affect the quality of the file 74 during presentation. However, in Scenario C, the unsuccessful retrieval of the FDT 78 may result in the loss of the entire file 74, because without the FDT 78, the whole file 74 cannot be processed. In that case, the node 50 may have to wait until the next carousal cycle, which can be many time periods, such as the time periods extended by the time passes 73 and 75, down the road merely to have another chance for the acquisition of the FDT 78. Should that occur, additional time delay and tying up of communication channels are unavoidable. If the device 50 is a mobile device, as in this example, extra time delay translates into additional power consumption in the battery of the device 50. In mobile communications, preservation of battery life is of significant importance.

In accordance with the exemplary embodiment of the invention, the FDTs and the content data packets are not received in-band as conventionally practiced. Instead, the file attributes and the content data are received out-of-band, as will be described later.

Hereinafter, the term "in-band" is construed to mean transport of information through the same transmission channel and further substantially within the same transmission session. An example of an in-band information transport is as shown and described in the transmission process of FIG. 4. On the other hand, the term "out-of-band" is construed to mean transport of information through different transmission sessions, irrespective of whether such a transport is through the same transmission channel or a different transmission channel, as exemplified by the transmission process shown in FIG. 5 and as described below.

Reference is now referred to FIG. 5. In this embodiment, the file attributes 82, such as the file attributes included in the FDTs 78 as mentioned previously, are transmitted separately, i.e., out-of-band instead of in-band, as compared to the payload data, such as the data packets #1-#5.

Preferably, the FAs are transmitted by the network 44 (FIG. 2) and in a broadcast channel. For example, the FAs can be part of the SG as mentioned earlier. The SG and thus the FAs are first acquired by the node 50 which seeks the broadcast service. That is, the FAs 82 are acquired during a first communication session 81. After the correct retrieval of the FAs 82, the node 50 may then tune to the channel according to the information provided in the SG to acquire the content files, such as the file 84. That is, the content files are acquired during a second communication session 86. As shown in FIG. 5, there are no FDTs interposed with the content file packets. Rather, the content files (e.g., the files 83 and 84) are designedly to be continuously and uninterruptedly transmitted. Phrased differently, the content files are downloaded during the communication session 86 only after it is assured that the node 50 has correctly retrieved the FAs 82 earlier during the communication session 81. Consequently, the situation where the successful processing of a file is at the mercy of a successful download of the corresponding FDT, when both the file and the FDT are received in-band and as described above can be avoided.

During the transmission process, if a defective data packet, for example the data packet #4 in the file 84 during the first pass 85 and is denoted by the reference numeral 90 in FIG. 5, is found, and further suppose the installed FEC mechanism fails to correct the defective packet #4, the corresponding data packet #4 in the second pass 87 can be retrieved for repair. If the repair process is not successful, there may be a certain degradation of quality of the file 84 during presentation. However, the situation as in the failed Scenario C shown in FIG. 4 and as described above can never occur. The reason is the FAs 82 have been successfully received earlier during the communication session 81, as earlier stated.

Operating in the manner as described above, there is no need to tie up any in-band channels for the transmission of the FDTs. Content file retrieval can thereby be executed with more certainty. File acquisition time can also be substantially curtailed. Consequently, congestion among communication channels can be eased, which in turn can result in more efficient use of available communication resources. Furthermore, if the node 50 (FIG. 2) is a mobile device, shorter file acquisition time means shorter time needed to wake up the battery of the node 50 during the download of the content files. Accordingly, battery power can be conserved.

It further should be noted that the FA 82 shown in FIG. 5 is one among many FAs needed to be acquired for the proper decoding of all the files for the sought service session, in which the file 84 is one of such files. However, the FA 82 has many common attributes for the retrieval of not only the file 84 but also for other files, such as the neighboring file 83. Accordingly, all the FAs can be organized as one master FA suitable for file retrieval of all files in a transmission session. As an alternative, instead of a master FA, an aggregated FA can be divided into two portions. The first portion can hold file attributes that are considered long-lived. Such attributes may include the file name, the file ID, the file location, the presentation time, and the distribution time window. On the other hand, attributes that are deemed relatively short-lived can be placed in the second portion of the FA. Short-lived attributes may include the application file size, the transmitted file size, the content type, the encoding scheme, the FEC-type and parameters, and the security-related parameters. The first portion can remain in the SG relatively unchanged over time. The second portion can be updated periodically in the SG to reflect the changing conditions.

As mentioned earlier, some files can be downloaded first and later executed by the user at a time chosen by user. Examples are music files and files for software updates. Other files can be downloaded first but preferred to be presented at a specific time. An example is a news broadcast session as will be described below. In either case, in accordance with another aspect of the invention, content file acquisition and presentation need not be carried out simultaneously. Instead, file acquisition can be executed separately and ahead of the file presentation process.

Figure 6:
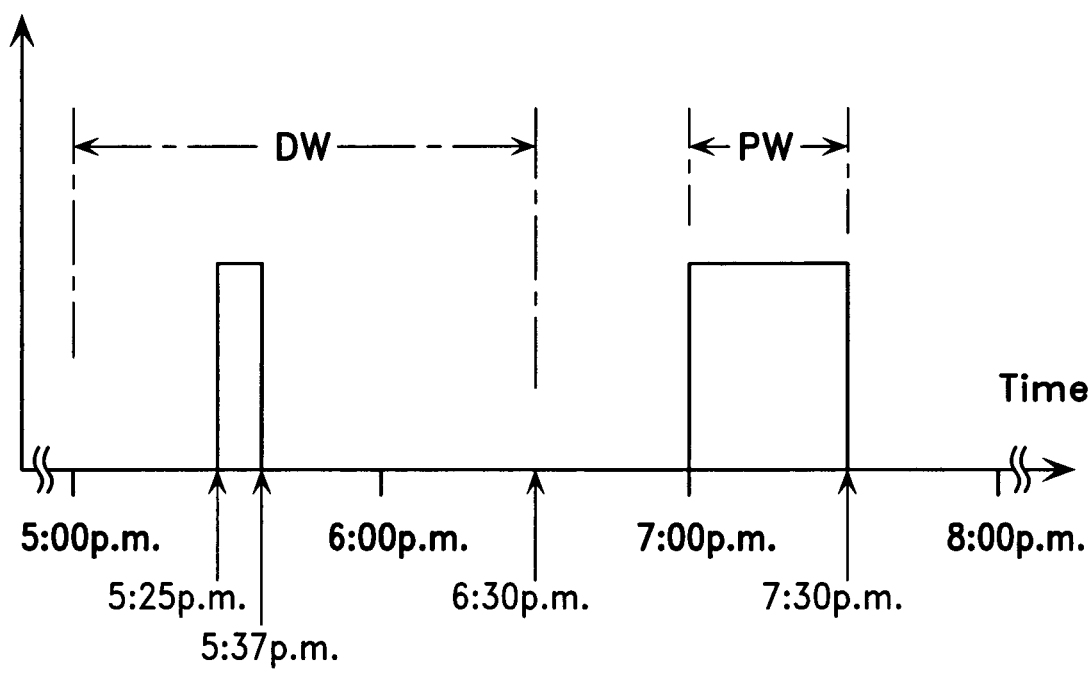
FIG. 6 is a timing diagram which shows delivery and presentation of files carried out during different time windows.

For ease of explanation, a more specified example is illustrated. Reference is now returned to FIG. 2. Suppose in this example, the user of the node 50 wants to watch a news broadcast normally available at 7:00 p.m via regular television broadcast. In the SG broadcasted by the network 44, associated information concerning the 7:00 p.m. news clip is usually available. The network 44 has such information from the service providing network 42 via the backbone network 46. In the SG, it may specify two time windows, namely, a "distribution window (DW)" and a "presentation window (PW)." FIG. 6 shows such an arrangement.

In the DW, a time window is specified in which the node 50 needs to be activated in order to receive the files for the 7:00 p.m. news session. For instance, in this example, from 5:00 p.m. to 6:30 p.m., that is the time intervals during which the node 50 can be powered on to receive the news files. On the other hand, the PW identified the presentation time of the downloaded news session, in the example, from 7:00 p.m. to 7:30 p.m. That is, during this time span, the downloaded files will be presented as the 7:00 p.m. news. An additional benefit of separating the DW from the PW is allow subscribers to download files in advance of the presentation time so as to avoid traffic channel overloading during presentation times which normally coincide with peak hours. Even in the event of heavy traffic load in the network 44 during the DW, individual file downloads can still be slowly trickled down to their respective receivers and be completed well before the start of the PW.

Based on the information provided by the SG, suppose the node 50 is powered on and activated during the time period from 5:25 p.m. to 5:37 p.m. for the receipt of news clip. The time required for the download, in this example 12 minutes, can be shorter than the time for presentation, in this case 30 minutes, if appropriate file compression techniques are implemented.

Figure 7:
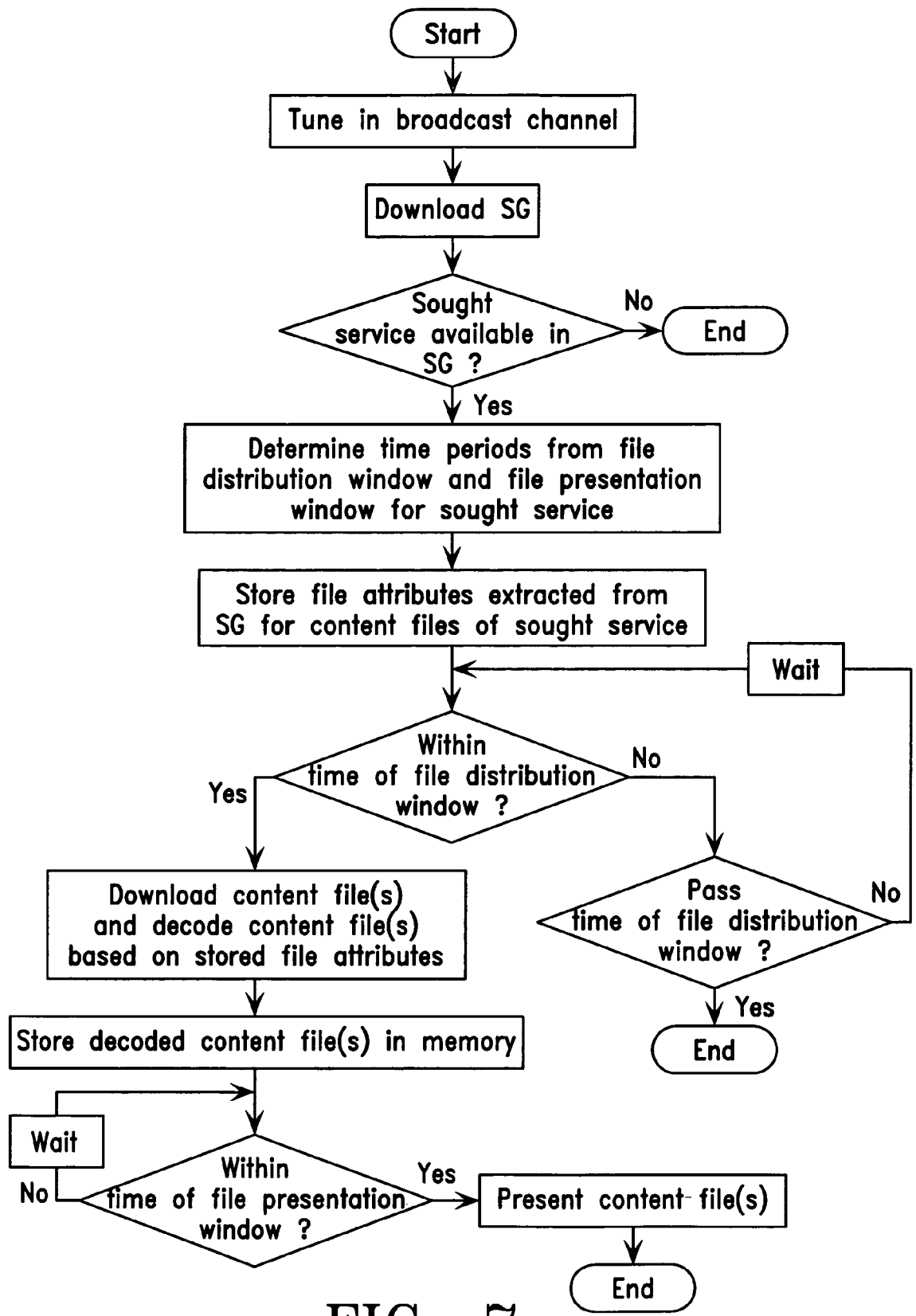
FIG. 7 is a flowchart showing file retrieval and processing in accordance with the exemplary embodiment of the invention.
Figure 8:
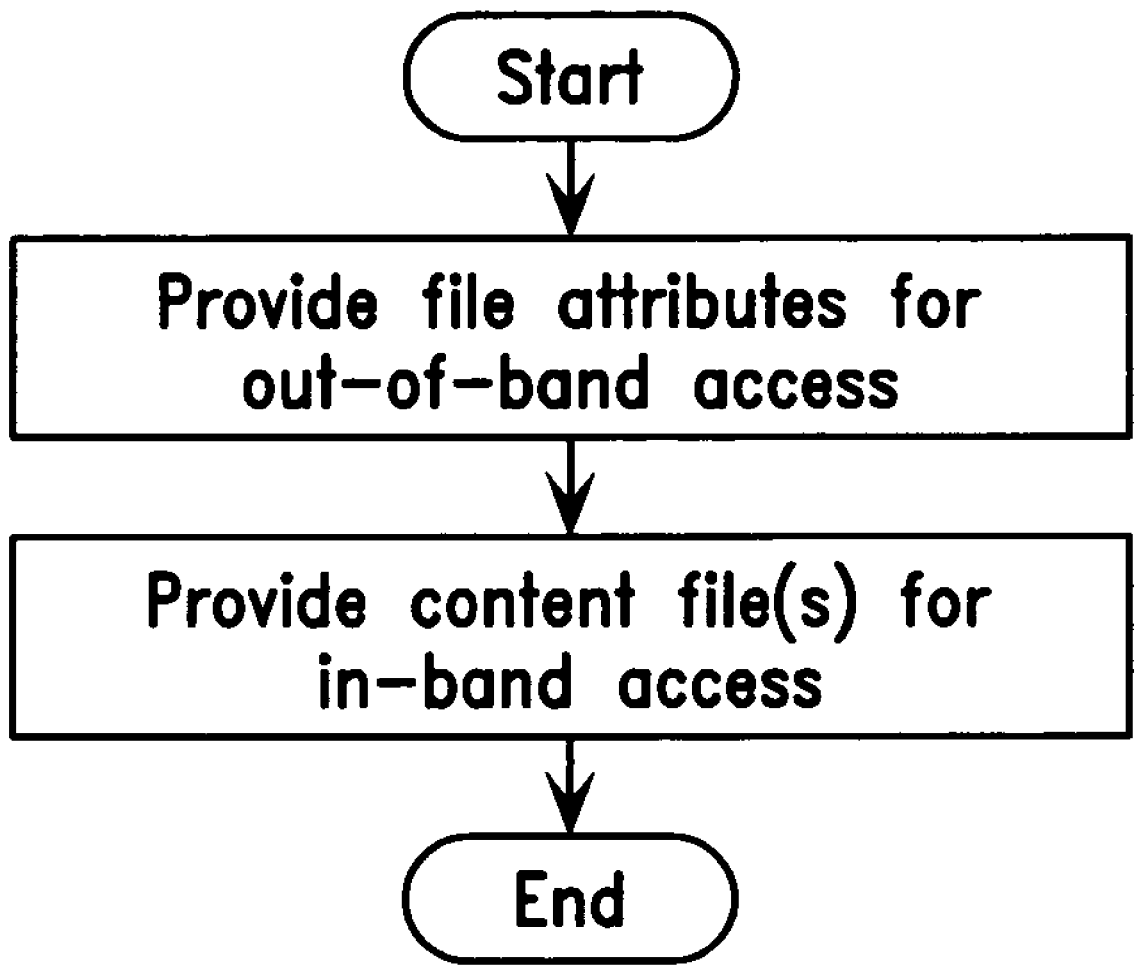
FIG. 8 is a flowchart showing file delivery in accordance with the exemplary embodiment of the invention.

The aforementioned method for the node 50 are shown in the flowcharts of FIG. 7. FIG. 8 shows the corresponding method practiced by the network 44.

In accordance with yet another aspect of the invention, transport of payload data can further be streamlined.

For the download of the file content, the FLUTE/ALC protocol may be employed. As mentioned earlier, unlike the FTP in which data packets are transported via the TCP transport layer (FIG. 3), data packets in the FLUTE/ALC are carried over the UDP transport layer. The FTP is geared more toward one-to-one applications and erroneous packets are normally retransmitted, albeit slowing down the overall transmission process. The FLUTE/ALC protocol carried via the UDP is designed to be suitable for multicast or broadcast applications. Erroneous data are not normally retransmitted. Instead, errors in data transmissions are curtailed by employing appropriate forward error correction (FEC) schemes.

Reference is now made to FIG. 3A, which schematically shows the FLUTE/ALC protocol generally signified by the reference number 96. Data packets for the FLUTE protocol are transported carried by the ALC protocol. The ALC protocol is set forth in the publication RFC 3450, published by the IETF, entitled "Asynchronous Layered Coding (ALC) Protocol Instantiation" December 2002. The ALC protocol is one of the basic protocols proposed for multicast transport. Data transport involving ALC requires no uplink signaling, i.e., signaling from the receiver to the transmitter, and employs the use of FEC for reliable data retrieval. The ALC also utilizes the Layered Coding Transport (LCT) building block 98 for multi-rate congestion control (CC) 97 and the FEC building block 99 for reliable content delivery. The LCT is described in the IETF publication, RFC 3451, entitled "Layered Coding Transport (LCT) Building Block," December 2002. The FEC is described in RFC 3453, also published by the IETF.

The FLUTE protocol represents an application of the ALC for multicast file delivery. However, the conventional FLUTE/ALC protocol is primarily designed for non-mobile environments. In a wireless environment where battery power needs to be conserved and air-link bandwidths are precious, the file download process can further be streamlined. To accomplish this end, each data packet in the payload can be designed to be more compact.

Figure 9:
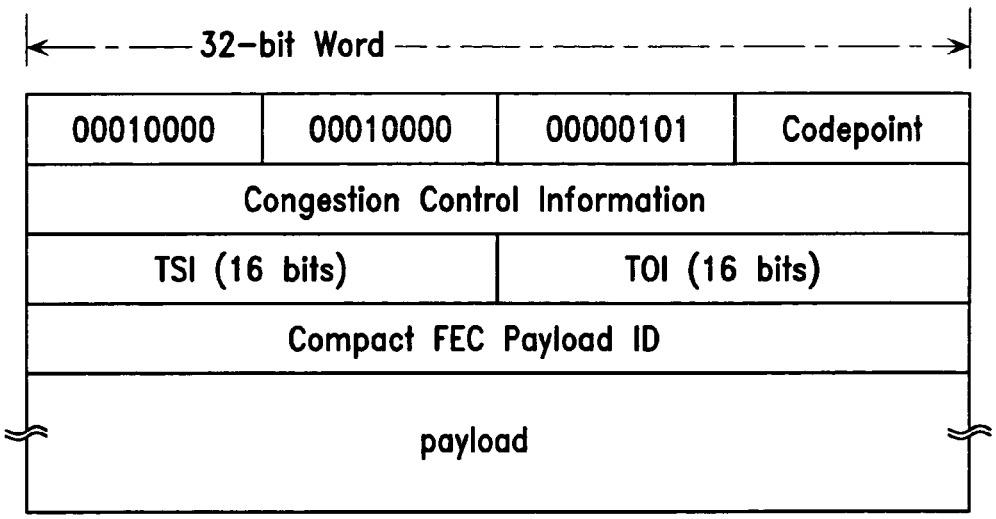
FIG. 9 is schematic drawing which shows an exemplary compact ALC data packet.

FIG. 9 shows an exemplary compact ALC data packet, identified by the reference numeral 94, which is formatted to be more in compliance with the conventional ALC packet as specified in RFC 3450. The ALC packet format 94 is designedly to be identical to the broad/multicast service (MBMS) as promulgated by the 3GPP2 in a published document 3GPP TS 23.346. The main difference between the format as shown in the data packet 84 and that as specified in the document 3GPP TS 23.346 is the absence of any in-band transmission of file description information, i.e., the file attributes needed to process the payload of the data packet 94.

Figure 10:
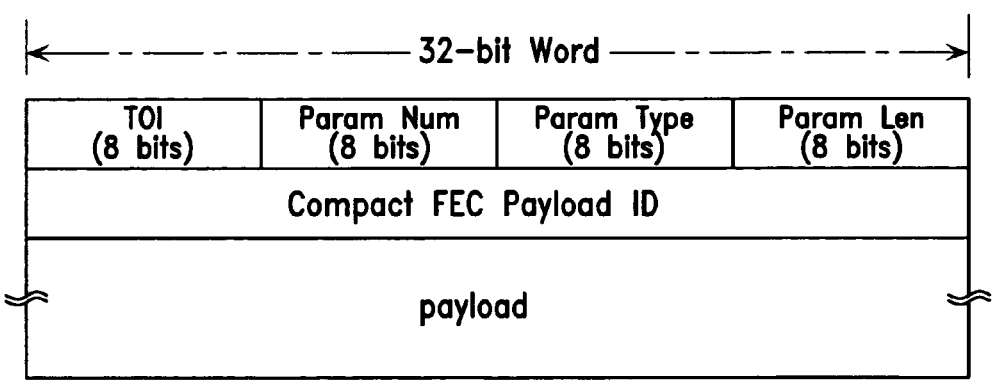
FIG. 10 is a schematic drawing which shows another compact packet format suitable for file delivery over wireless communications.

FIG. 10 shows another exemplary compact packet format signified by the reference numeral 96. The data packet 96 is substantially streamlined and is suitable for use in a wireless communication environment. Among other things, the congestion control information is dispensed with. As in a wireless environment, the wireless medium is the sole access means, congestion control for regulating multiple access means at different data rates need not be necessary. In the data packet 94 shown in FIG. 9, the overhead is 16 bytes. As for the data packet 96 shown in FIG. 10, the overhead is only 8 bytes.

Figure 11:
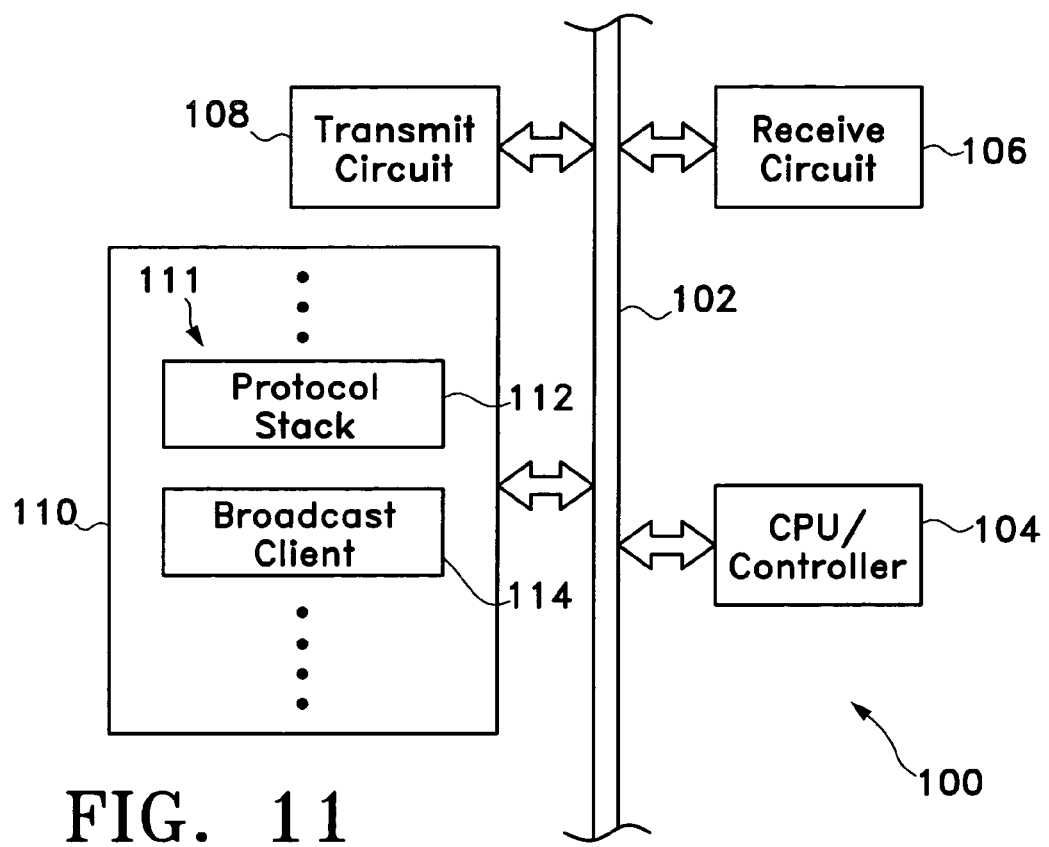
FIG. 11 is a schematic drawing of part of the circuitry of a node configured to receive and process broadcast files in accordance with the exemplary embodiment of the invention.

FIG. 11 schematically shows the part of the hardware implementation of an apparatus, such as the node 50 shown in FIG. 2, signified by the reference numeral 100 in accordance with the exemplary embodiment of the invention. The apparatus 100 can be built and incorporated in various forms, such as a laptop computer, a PDA, or a cellular phone, to name just a few.

The apparatus 100 comprises a central data bus 102 linking several circuits together. The circuits include a CPU (Central Processing Unit) or a controller 104, a receive circuit 106, a transmit circuit 108, and a memory unit 110.

If the apparatus 100 is part of a wireless device, the receive and transmit circuits 106 and 108 can be connected to a radio frequency (RF) circuit but is not shown in the drawing. The receive circuit 106 processes and buffers received signals before sending out to the data bus 102. On the other hand, the transmit circuit 108 processes and buffers the data from the data bus 102 before sending out of the device 100. The CPU/controller 104 performs the function of data management of the data bus 102 and further the function of general data processing, including executing the instructional contents of the memory unit 110.

Instead of separately disposed as shown in FIG. 11, as an alternative, the transmit circuit 108 and the receive circuit 106 can be parts of the CPU/controller 104.

The memory unit 110 includes a set of instructions generally signified by the reference numeral 101. In this embodiment, the instructions include, portions such as the protocol stack function 112 capable of processing, among other things, the FULTE/ALC protocol as described above. The set of instructions also include a broadcast client function 114 capable of executing the method as shown and described in FIG. 7.

In this embodiment, the memory unit 110 is a RAM (Random Access Memory) circuit. The exemplary instruction portions 112 and 114 are software routines or modules. The memory unit 110 can be tied to another memory circuit (not shown) which can either be of the volatile or nonvolatile type. As an alternative, the memory unit 110 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

Figure 12:
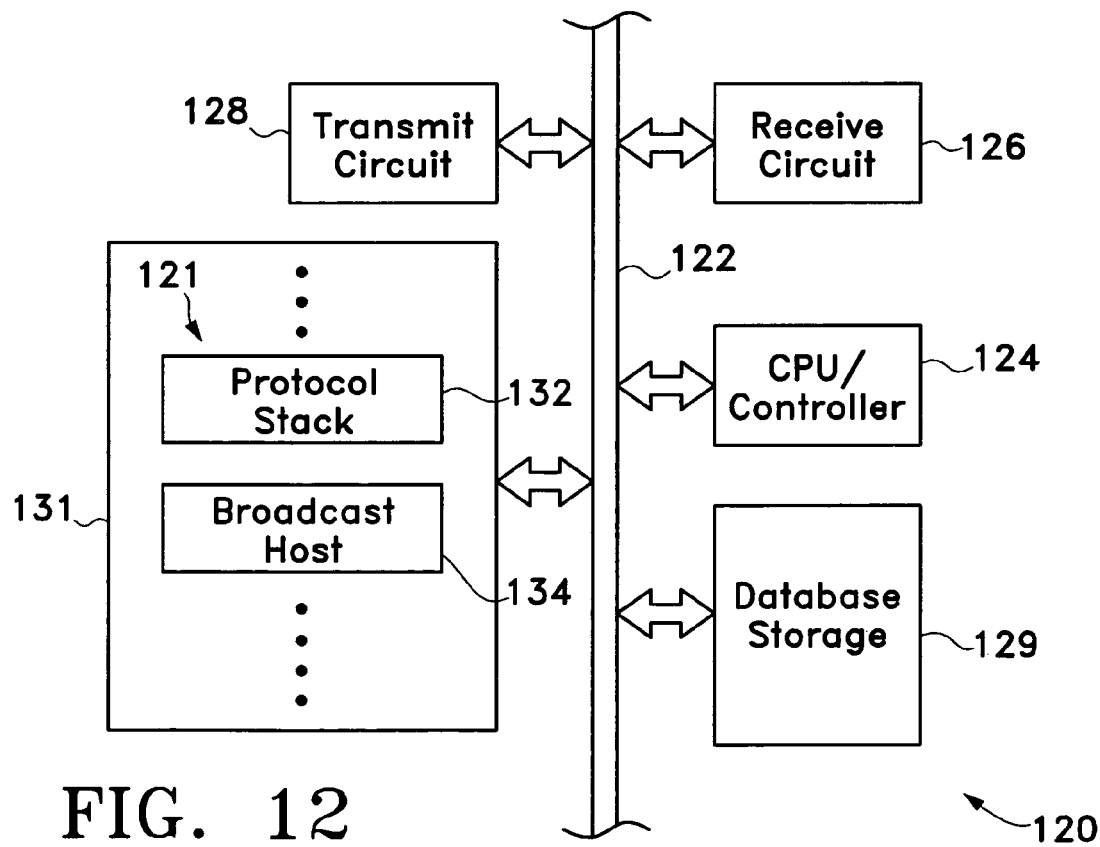
FIG. 12 is a schematic drawing of part of the circuitry of a node configured to deliver broadcast files in accordance with the exemplary embodiment of the invention.

FIG. 12 schematically shows the part of the hardware implementation of a broadcast server, such as the BSN apparatus 70 shown in FIG. 2 and is signified by the reference numeral 120. The apparatus 120 comprises a central data bus 122 linking several circuits together. The circuits include a CPU (Central Processing Unit) or a controller 124, a receive circuit 126, a transmit circuit 128, a data base storage unit 129, and a memory unit 131.

The receive and transmit circuits 126 and 128 can be connected to a network data bus (not shown) where the apparatus 120 is linked to. The receive circuit 126 processes and buffers received signals from the network data bus (not shown) before routing to the internal data bus 122. The transmit circuit 128 processes and buffers the data from the date bus 122 before sending out of the apparatus 120. Alternatively, the transmit circuit 128 and the receive circuit 126 can be collectively called the interface circuit. The CPU/controller 124 performs the duty of data management of the data bus 122 and for the function of general data processing, including executing the instructional content of the memory unit 131. The database storage unit 129 stores data, such as the SGs with their various parameters and the content files.

The memory unit 131 includes a set of instructions generally signified by the reference numeral 121. In this embodiment, the instructions include portions, among other things, a protocol stack 132 and a broadcast host 134. The memory unit 131 can be made of memory circuit types as mentioned above and are not further repeated. The functions for the protocol stack 121 and the broadcast host 134 include the instructional sets in accordance with the invention such as shown in FIGS. 3 and 8 and as described previously.

It should further be noted that the processes as described and shown in FIGS. 7 and 8 above can also be coded as computer-readable instructions carried on any computer-readable medium known in the art. In this specification and the appended claims, the term "computer-readable medium" refers to any medium that participates in providing instructions to any processor, such as the CPU/controller 104 and 124 shown and described in FIGS. 11 and 12, respectively, for execution. Such a medium can be of the storage type and may take the form of a volatile or non-volatile storage medium as also described previously, for example, in the description of the memory units 110 and 131 in FIGS. 11 and 12, respectively. Such a medium can also be of the transmission type and may include a coaxial cable, a copper wire, an optical cable, and the air interface carrying acoustic or electromagnetic waves capable of carrying signals readable by machines or computers.

Finally, described in the embodiment, the node the BSD 48 is described as installed in the network 42 of the service provider. This may not always be the case. It is possible that the BSD 48 be installed in another network not owned by the service provider. Moreover, out-of-band transmission channels as described in the exemplary embodiment can be distinguished either logically or physically, as commonly practiced in the art of spread-spectrum communications. In addition, the different out-of-band sessions can be identified by different port numbers, other than time separations as aforementioned. Thus, for instance, in FIG. 5, the FDTs can be transmitted under over the UDP of Layer 4 (FIG. 3) via one destination port corresponding to the first transmission session. The content files can be transmitted over the UDP of Layer 4 via another destination port number during the second transmission session. In addition, it should also be clear that the flow chats in FIGS. 7 and 8 also apply to downloading and executing of files at the user's choice, such as a musical file. For example, the user can glean from the SG and determines on his or her own the file distribution and file presentation windows. Furthermore, described in the exemplary embodiment, the backbone network is depicted as operated under the IP. Other protocols other than the IP are possible. For example, in a FLO network, the protocol according to the document, floforum2005.001, entitled "FLO Air Interface Specification" published by the FLO Forum, would be applicable. In the FLO network, instead of the SG, the corresponding file attributes can be put in the System Information (SI), details of which can be found in the document floforum2006.005, published by the FLO Forum. In addition, any logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. A method for file downloading of a broadcast in a communication system, comprising:
   receiving file attributes of at least one content file solely in an out-of-band communication session; and
   receiving the at least one content file of the broadcast solely in an in-band communication session, separately from the file attributes;
   wherein the file attributes are received ahead of and used to reconstruct the at least one content file, and wherein said communication system supports Internet Protocol (IP), said method further comprising: receiving said file attributes through the User Datagram Protocol (UDP) of said IP via a first port number; and receiving said at least one content file through said UDP of said IP via a second port number.

2. The method as in claim 1 further comprising:
   receiving said file attributes through a first communication channel; and receiving said at least one content file through a second communication channel.

3. The method as in claim 1 further comprising receiving a plurality of files continuously for said broadcast in said in-band communication session, and receiving said file attributes for processing said plurality of files in said out-of-band communication session which is earlier than said in-band communication session.

4. The method as in claim 1 wherein said at least one content file includes a plurality of data packets, said method further comprising receiving no file attributes in each of said data packets for processing said at least one content file.

5. The method as in claim 1 further comprising receiving a plurality of files of said broadcast in said in-band communication session, and further comprising processing said plurality of files using some of said file attributes which are commonly shared among said plurality of files for processing said plurality of files.

6. The method as in claim 1 further comprising providing in said file attributes time information for presenting said at least one content file of said broadcast so as to allow presenting of said at least one content file at a predetermined time.

7. A method for file delivery of a broadcast in a communication system, comprising:
   sending file attributes of at least one content file solely in an out-of-band communication session; and
   sending the at least one content file of the broadcast solely in an in-band communication session, separately from the file attributes;
   wherein the file attributes are sent ahead of the at least one file used by a receiving node to reconstruct the at least one content file, and wherein said communication system supports Internet Protocol (IP), said method further comprising: sending said file attributes through the User Datagram Protocol (UDP) of said IP via a first port number; and sending said at least one content file through said UDP of said IP via a second port number.

8. The method as in claim 7 further comprising:
   sending said file attributes through a first communication channel; and
   sending said at least one content file through a second communication channel.

9. The method as in claim 7 further comprising sending a plurality of files continuously for said broadcast in said in-band communication session, and sending said file attributes for processing said plurality of files in said out-of-band communication session which is earlier than said in-band communication session.

10. The method as in claim 7 wherein said at least one content file includes a plurality of data packets, said method further comprising providing no file attributes in each of said data packets for processing said at least one content file.

11. The method as in claim 7 further comprising sending a plurality of files of said broadcast in said in-band communication session and further comprising providing some of said file attributes which are commonly shared among said plurality of files for processing said plurality of files in said out-of-band communication session.

12. The method as in claim 7 further comprising in said file attributes time information for presenting said at least one content file of said broadcast.

13. An apparatus configured to receive a broadcast in a communication system that supports Internet Protocol (IP), the apparatus comprising:
   means for receiving file attributes of at least one content file solely in an out-of-band communication session;
   means for receiving the at least one content file of the broadcast solely in an in-band communication session, separately from the file attributes, the file attributes being received ahead of and used to reconstruct the at least one content file;
   means for receiving said file attributes through the User Datagram Protocol (UDP) of said IP via a first port number; and
   means for receiving said at least one content file through said UDP of said IP via a second port number.

14. The apparatus as in claim 13 further comprising:
   means for receiving said file attributes through a first communication channel; and
   means for receiving said at least one content file through a second communication channel.

15. The apparatus as in claim 13 further comprising means for receiving a plurality of files continuously for said broadcast in said in-band communication session, and means for receiving said file attributes for processing said plurality of files in said out-of-band communication session which is earlier than said in-band communication session.

16. The apparatus as in claim 13 wherein said at least one content file includes a plurality of data packets, wherein each of said data packets includes no file attributes for processing said at least one content file.

17. The apparatus as in claim 13 further comprising means for receiving a plurality files of said broadcast in said in-band communication session and further comprising means for processing said plurality of files using some of said file attributes which are commonly shared among said plurality of files for processing said plurality of files.

18. The apparatus as in claim 13 wherein said file attributes comprise time information for presenting said at least one content file of said broadcast so as to allow presenting of said at least one content file at a predetermined time.

19. An apparatus for file delivery of a broadcast in a communication system that supports Internet Protocol (IP), the apparatus comprising:
   means for sending file attributes of at least one content file solely in an out-of-band communication session;
   means for sending the at least one content file of the broadcast solely in an in-band communication session, separately from the file attributes, the file attributes being sent ahead of the at least one file used by a receiving node to reconstruct the at least one content file;

means for sending said file attributes through the User Datagram Protocol (UDP) of said IP via a first port number; and means for sending said at least one content file through said UDP of said IP via a second port number.

20. The apparatus as in claim 19 further comprising:
means for sending said file attributes through a first communication channel; and
means for sending said at least one content file through a second communication channel.

21. The apparatus as in claim 19 further comprising means for sending a plurality of files continuously for said broadcast in said in-band communication session, and means for sending said file attributes for processing said plurality of files in said out-of-band communication session which is earlier than said in-band communication session.

22. The apparatus as in claim 19 wherein said at least one content file includes a plurality of data packets, said apparatus further comprising means for providing no file attributes in each of said data packets for processing said at least one content file.

23. The apparatus as in claim 19 further comprising means for sending a plurality files of said broadcast in said in-band communication session and further comprising means for providing some of said file attributes which are commonly shared among said plurality of files for processing said plurality of files in said out-of-band communication session.

24. The apparatus as in claim 19 wherein said file attributes comprise time information for presenting said at least one content file of said broadcast.

25. An apparatus used in a broadcast in a communication system that supports Internet Protocol (IP), the apparatus comprising:
a processor; and
a memory unit coupled to the processor, the memory unit including processor-executable instructions for: receiving file attributes of at least one file of the broadcast solely in an out-of-band communication session; receiving the at least one content file of the broadcast solely in an in-band communication session, separately from the file attributes, wherein the file attributes are received ahead of and used to reconstruct the at least one content file; receiving said file attributes through the User Datagram Protocol (UDP) of said IP via a first port number; and receiving said at least one content file through said UDP of said IP via a second port number.

26. The apparatus as in claim 25 wherein said memory unit further comprising processor executable instructions for receiving said file attributes through a first communication channel, and receiving said at least one content file through a second communication channel.

27. The apparatus as in claim 25 wherein said memory unit further comprising processor-executable instructions for receiving a plurality of files continuously for said broadcast in said in-band communication session, and receiving said file attributes for processing said plurality of files in said out-of-band communication session which is earlier than said in-band communication session.

28. The apparatus as in claim 25 wherein said at least one content file includes a plurality of data packets, and wherein each of said data packets includes no file attributes for processing said at least one content file.

29. The apparatus as in claim 25 wherein said memory unit further comprising processor-executable instructions for receiving a plurality files of said broadcast in said in-band communication session, and processing said plurality of files using some of said file attributes which are commonly shared among said plurality of files for processing said plurality of files.

30. The apparatus as in claim 25 wherein said file attributes comprise time information for presenting said at least one content file of said broadcast so as to allow presenting of said at least one content file at a predetermined time.

31. An apparatus for file delivery of a broadcast in a communication system that supports Internet Protocol (IP), the apparatus comprising:
a processor; and
a memory unit coupled to the processor, the memory unit including processor-executable instructions for sending file attributes of at least one content file of the broadcast solely in an out-of-band communication session; sending the at least one content file of the broadcast solely in an in-band communication session, separately from the file, wherein the file attributes are sent ahead of the at least one file and used to reconstruct the at least one content file; sending said file attributes through the User Datagram Protocol (UDP) of said IP via a first port number; and sending said at least one content file through said UDP of said IP via a second port number.

32. The apparatus as in claim 31 wherein said memory unit further comprising processor-executable instructions for sending said file attributes through a first communication channel, and sending said at least one content file through a second communication channel.

33. The apparatus as in claim 31 wherein said memory unit further comprising processor-executable instructions for sending said at least one content file through the File Delivery over Unidirectional Transport (FLUTE) of said IP in conjunction with said UDP of said IP.

34. The apparatus as in claim 31 wherein said memory unit further comprising processor-executable instructions for sending a plurality of files continuously for said broadcast in said in-band communication session, and sending said file attributes for processing said plurality of files in said out-of-band communication session which is earlier than said in-band communication session.

35. The apparatus as in claim 31 wherein said at least one content file includes a plurality of data packets, wherein each of said data packets includes no file attributes for processing said at least one content file.

36. The apparatus as in claim 31 wherein said memory unit further comprising processor-executable instructions for sending a plurality files of said broadcast in said in-band communication session and providing some of said file attributes which are commonly shared among said plurality of files for processing said plurality of files in said out-of-band communication session.

37. The apparatus as in claim 31 wherein said file attributes comprise time information for presenting said at least one content file of said broadcast.

38. A non-transitory computer-readable storage medium including computer-executable instructions encoded thereon for:
receiving file attributes for processing contents of at least one content file solely in an out-of-band communication session of a broadcast in a communication system that supports Internet Protocol (IP);
receiving the at least one content file of a broadcast solely in an in-band communication session, separately from the file attributes, wherein the file attributes are received ahead of and used to reconstruct the at least one file;
receiving said file attributes through the User Datagram Protocol (UDP) of said IP via a first port number; and receiving said at least one content file through said UDP of said IP via a second port number.

39. The non-transitory computer-readable storage medium as in claim 38 further comprising computer-executable instructions encoded thereon for:

receiving said file attributes through a first communication channel; and receiving said at least one content file through a second communication channel.

40. A non-transitory computer-readable storage medium including computer-executable instructions encoded thereon for:

sending file attributes of at least one file solely in an out-of-band communication session of a broadcast in a communication system that supports Internet Protocol (IP);

sending the at least one content file of a broadcast solely in an in-band communication session, separately from the file attributes, wherein the file attributes are sent ahead of the at least one file and used by a receiving node to reconstruct the at least one content file;

sending said file attributes through the User Datagram Protocol (UDP) of said IP via a first port number; and sending said at least one content file through said UDP of said IP via a second port number.

41. The non-transitory computer-readable storage medium as in claim 40 further including computer-executable instructions encoded thereon for:

sending said file attributes through a first communication channel; and sending said at least one content file through a second communication channel.

* * * * *